United States Patent [19]

Thomas et al.

[11] 4,217,602
[45] Aug. 12, 1980

[54] METHOD AND APPARATUS FOR GENERATING AND PROCESSING TELEVISION SIGNALS FOR VIEWING IN THREE DIMENSIONS

[75] Inventors: Wayne W. Thomas; Walter C. Thomas, both of Tahlequah, Okla.

[73] Assignee: Lady Bea Enterprises, Inc., Tahlequah, Okla.

[21] Appl. No.: 11,399

[22] Filed: Feb. 12, 1979

[51] Int. Cl.² .............................................. H04N 9/60
[52] U.S. Cl. ...................................................... 358/3
[58] Field of Search ................................ 358/3, 88, 89

[56] References Cited

U.S. PATENT DOCUMENTS

| 3,457,364 | 7/1969 | Carrillo | 358/3 |
| 3,697,675 | 10/1972 | Beard | 358/3 |
| 4,164,748 | 8/1979 | Nagata | 358/3 |

FOREIGN PATENT DOCUMENTS 2302151  7/1974  Fed. Rep. of Germany ............... 358/3

OTHER PUBLICATIONS

"A Compatible Stereo Television System," Nithiyanandam IEEE Trans on Broadcasting, vol. BC-20, #4, p. 91, Dec. 1974.

Primary Examiner—Michael A. Masinick
Attorney, Agent, or Firm—Head & Johnson

[57] ABSTRACT

Apparatus for generating and processing television TV signals of a visual scene for viewing in three dimensions, comprises a conventional TV camera, including three separate color video camera tubes, each camera tube adapted to receive light of a different one of the three primary colors. Each camera tube is aligned with one of three optical axes which are nominally parallel, and are spaced apart a selected distance in a horizontal plane. At least one of the first and third axes is rotatable so that it can be turned through a small angle in such a direction as to intersect the second and third axes at selected distances in front of the camera. Synchronizing beams are provided for two sub-rasters in scanning of the camera tubes. During a first scan, the first primary color signal from the first camera tube is muted, and on the second sub-raster, the third camera tube output carrying a third primary color signal is muted. When the transmitter signal is received and displayed on a TV receiver and is viewed through a pair of eye glasses, in which one glass passes the first primary color and the other glass passes the third primary color, the visual scene will be seen in three dimensional viewing.

13 Claims, 7 Drawing Figures

METHOD AND APPARATUS FOR GENERATING AND PROCESSING TELEVISION SIGNALS FOR VIEWING IN THREE DIMENSIONS

BACKGROUND OF THE INVENTION

1. Field of the Invention

This invention lies in the field of television signal generation and processing. More particularly it concerns a system for generating and processing TV signals from a visual scene, in which a three dimensional effect can be observed in the displayed TV signals, by properly orienting the optical axes of the three camera tubes, and by alternately muting the signals from a first and third tube which are adapted to pass the first and third primary colors.

2. Description of the Prior Art

In the moving picture industry, displays of moving pictures have been prepared and displayed for observation with a three-dimensional effect. This has been accomplished by using two separate cameras, with optical axes spaced apart and nominally parallel, but converging at a selected small angle. The light reaching each camera is filtered with one or the other of two primary colors. The corresponding pictures are displayed sequentially, while the observer watches the display with eye glasses, in which one glass passes the first primary color and the second glass passes the second primary color.

In the moving picture industry to obtain the three dimensional effect requires essentially doubling the photographic apparatus and doubling the number of frames of film which are prepared and projected. This doubling of cost has had an affect on the acceptance of the process, which apparently makes the process uneconomical.

In the field of television the applicants are unaware of any prior art in which a three-dimensional display has been made.

SUMMARY OF THE INVENTION

It is the primary object of this invention to provide a modification of the conventional television camera system so that a television picture can be generated and processed, such that the display of that picture on a television receiver can be viewed in three-dimensional projection.

It is a further object of this invention to provide a simple modification of the television receiver to provide a pseudo three-dimensional display.

It is a still further object of this invention to provide a modification of the TV camera and processing apparatus to make possible three-dimensional viewing of the received and displayed signal, while making it possible also to view the display in a conventional manner in two-dimensional presentation.

These and other objects are realized and the limitations of the prior art are overcome in this invention, by utilizing a conventional television camera, in which there are three video camera tubes C1, C2 and C3, receiving light along three different optical axes A1, A2 and A3, which are spaced apart and are nominally parallel to each other in a horizontal plane. Axis A1 is filtered with a filter F1 to pass a first primary color to C1. Similarly axis A2 is filtered with a filter F2 to pass the camera C2 a second primary color, such as green, and the third optical axis A3 is provided with a filter F3 to pass to the camera C3 the third primary color, such as blue. The outputs of the three camera tubes C1, C2 and C3 are processed with video amplifiers V1, V2 and V3 in a conventional manner.

A conventional camera control is used which provides a synchronizing buss that sequences two sub-sweeps, or sub-rasters, which are interleaved. During a first raster, the output of the first video amplifier carrying the red signal is muted, or cut off, or disabled, and during the second sub-raster the corresponding output of the video amplifier V3, carrying the blue signal is cut off or muted. Otherwise the three output signals from the video amplifiers are processed in a normal manner to provide a conventional television signal to the transmitter, and eventually to a receiver.

In the receiver there will be on a first raster a picture displayed which will be deficient in red, and on the second raster there will be a picture displayed deficient in blue and so on. When these series of pictures are observed through eye glasses in which one lens is red and one lens is blue, the display will have a three-dimensional character, dependent on the directions of the optical axes of the red and blue video camera tubes.

The principal difference between this invention and the conventional camera is, that at least one of the three optical axes representing the three primary colors must be rotatable toward the other two. Preferably two optical axes, the first and third, should be rotatable towards the center one.

This type of operation can be provided with either one lens, or with two or three separate lenses. The simplest to conceive of is the one in which a separate lens is used in each of the three optical axes. Of course the lenses will be controlled together so that their focus and their zoom will be in step with each other, but their optical axes will not be precisely parallel, as they would be in the conventional camera.

In a second embodiment, two lenses can be used. One lens is in the first, or red optical axis. The other is in the third or blue optical axis. One or the other, or both lenses supply the green light to the central or second optical axis.

The system can also be used with one lens. In the case of the single camera lens, the three optical axes are formed out in front of the lens by use of appropriate mirrors and filters and possible simple lenses. Then the conventional mirrors and filters are used behind the lens and ahead of the camera tubes.

A further part of this invention lies in an apparatus modification on a television receiver, which is receiving conventional television signals taken with a single lens, and with the three optical axes precisely parallel. In this embodiment means are provided for alternately muting the red and the green signal from the video amplifiers in the receiver, to the control guns in the tube. If desired one or the other of the red and blue signals can be delayed with respect to the other one, to give the impression of a three-dimensional viewing situation.

DESCRIPTION OF THE DRAWINGS

These and other objects and advantages of this invention, and a better understanding of the principles and details of the invention will be evident from the following description, taken in conjunction with the appended drawings in which.

DESCRIPTION OF THE PREFERRED EMBODIMENT

Figure 1:
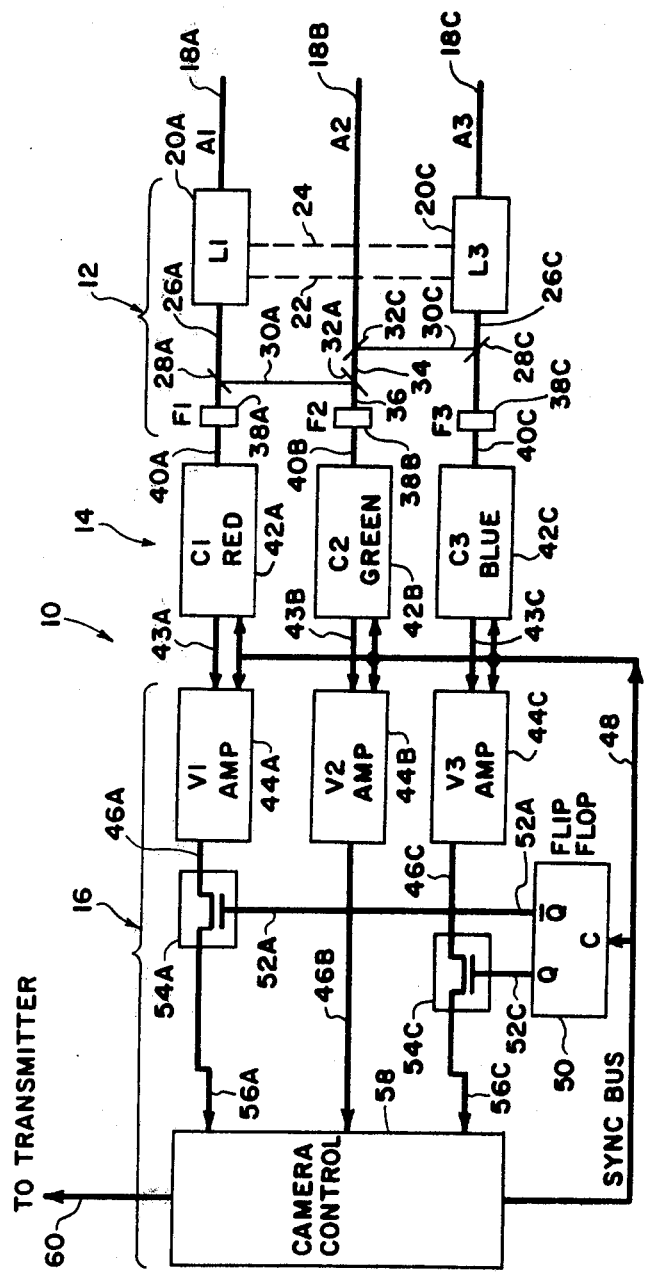
FIG. 1 is a schematic block diagram of the modified television camera, adapted to transmit processed signals which can be displayed and viewed in three-dimensions.

Referring now to the drawings, and in particular to FIG. 1, there is shown one embodiment of this invention indicated generally by the numeral 10. This is a schematic block diagram, in which there are several parts. The lens and filter portion indicated generally by the numeral 12, the separate color video camera tubes, indicated generally by the numeral 14 and the video amplifiers and procession apparatus, indicated generally by the numeral 16.

In the conventional television camera there are three video camera tubes, each one adapted to pass and process one of the three primary colors, such as, for example, red, green and blue. In FIG. 1, the first camera tube C1, number 42A processes the red light, camera tube C2, number 42B processes the green light and the third camera tube C3, 42C processes the blue light. The lines 18A, 18B and 18C represent the three optical axes. They are nominally parallel, and spaced apart a selected distance. When precisely parallel to each other, they will not transmit a three-dimensional signal. It is only when one or both of the outer optical axes A1 and/or A3 is rotated, so that it intersects the center optical axis A2 at some selected distance in front of the camera, that the appearance of a three-dimensional picture will be evident. The details of rotating the optical axis will be discussed in connection with FIG. 5.

In FIG. 1 two camera lenses are shown L1, numeral 20A and L3, numeral 20C, respectively in the optical axes A1 and A3. The dash lines 22 and 24 represent control means, which tie together the two lenses L1 and L3, so that as one is rotated the other one will be rotated and the focus of each of them will track together and the zoom effect will also track. The precise directions of the three axes are important only in the region of the lenses L1 and L3. After that the optical axis moves into the camera but the precise position of the video camera tubes can be altered by the use of mirrors, etc. However, for convenience, and other reasons and without limitation the three video camera tubes C1, C2 and C3 will be described as co-axial of the lenses L1 and L3. As the axis A1 is rotated the lens and the camera tube will be rotated together, as will be described in connection with FIG. 5. However, by the same means as in FIG. 5, the camera tube can remain stationary while the axis rotates.

Consider the optical axis 18A. Light from a distant scene, off to the right, arrives at the lense L1 and passes through the lens to be intercepted by partially silvered mirror 28A which passes part of the light through filter F1, numeral 38A and axis 40A to the camera tube 42A. The filter F1 will, for example, be such as to pass only the first primary color, red. The output signal of the camera 42A passes by leads 43A to the first video amplifier 44A for processing.

Part of the light deflected by mirror 28A passes as beam 30A to partially reflecting mirror 32A. This light is diverted through beam 36, filter F2, numeral 38B and beam 40B, to the second video camera tube 42B. Here the filter F2 is selected to pass the second of the primary colors such as green, for example.

Along optical axes 18C light from the scene arrives to the lens 20C and passes through the lens as beam 26C to a partially reflecting mirror 28C that passes part of the light to the filter F3 numeral 38C, beam 40C to the third video camera tube 42C. The filter F3 is designed to pass the third of the primary colors, namely blue, for example. The output of the video camera C3 goes by leads 43C to the video amplifier B3 for processing.

The mirror 28C in the optical axis 18C transmits part of the incoming light from lens L3 as beam 30C to a second partially reflecting mirror 32C which directs the light by beam 34 through the mirror 32A as beam 36 to the filter F2 and to the second video camera tube 42B. In other words, lens L1 passes red light to the first camera tube 42A, and part of the green light to the second camera tube 42B. The lens L3 in the third optical axis provides blue light to the third video tube C3 and some additional green light to the second video camera tube 42B.

A camera control 58 is provided as is customary in the video camera, and no detail of this control is required since the conventional control can be used. This camera control 58 provides a synchronizing buss 48 which provides signals to the video amplifiers and to the camera tubes to control the synchronization of the raster sweeps in all of the camera tubes and amplifiers. The camera control means 58 will provide two subscans interlaced, as in the conventional TV system. The synch-buss 48 is connected also to a flip-flop 50 which responsive to the synchronizing signal 48 is set to provide a Q output on 52C, during one sub-raster and a $\overline{Q}$ output on 52A during the second raster. The video tube V1 passes its output on lead 46A to an analog switch 54A and the output of the switch goes by lead 56A to the camera control. When there is positive signal on lead 52A, the analog switch will pass signals on lead 46A through 56A to the camera control 58 in exactly the same way that the signal goes from video amplifier V2 through lead 46B to the camera control. On the other hand, when there is no signal on lead 52A, the switch 54A will block the transmission of signal from 46A to the camera control.

Similarly when there is positive signal on lead 52C, the signal from the video amplifier 44C will go by lead 46C to the analog switch 54C, through lead 56C to the camera control, just as in the case of the video amplifier 44B. However, when a logical zero appears on the lead 52C, the switch 54C is opened or disabled, and there is no blue signal output from the video amplifier 44C to the camera control.

It is therefore clear that the flip-flop and the analog switches act as a synchronized switches, and other kinds of switches could be used, so that on the first raster the red signal and green signal are passed but no blue signal and on the second raster the green signal and blue signal are passed but no red signal.

Figure 7:
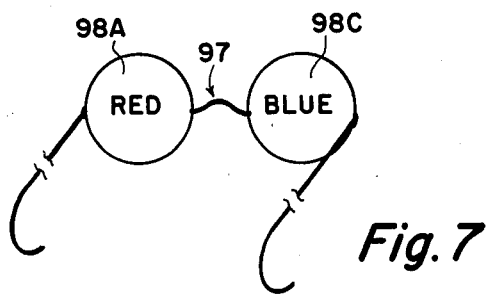
FIG. 7 illustrates a modified eye glass through which the three-dimensional picture can be viewed.

The three video signals on leads 56A, 46B and 56C are then processed in the camera control to provide the transmitted signal 60 to the transmitter, and eventually to a television receiver. To the normal eye the picture on the television receiver will look like any conventional picture in three colors and will be two-dimensional. However, if as shown in FIG. 7 a pair of eye glasses 97 are provided, in which one lens 98A is red-passing glass, and the lens 98C in the other part of the eye glass 97 is blue-passing glass, then the right and left eye will ultimately see the blue picture and the red picture which are not precisely aimed at the same scene and therefore will show a three-dimensional optical effect.

Figure 2:
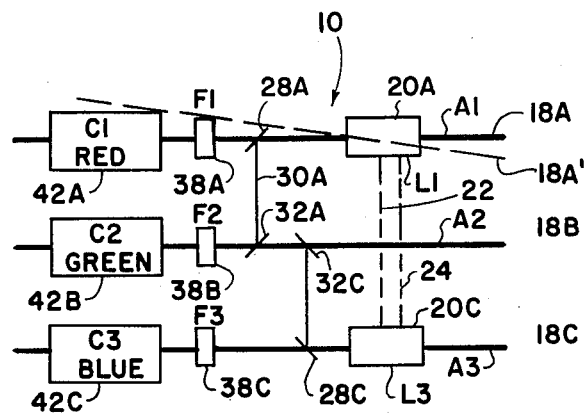
FIGS. 2, 3, and 4 illustrate different embodiments of lenses in order to utilize the three-dimensional display.
Figure 3:
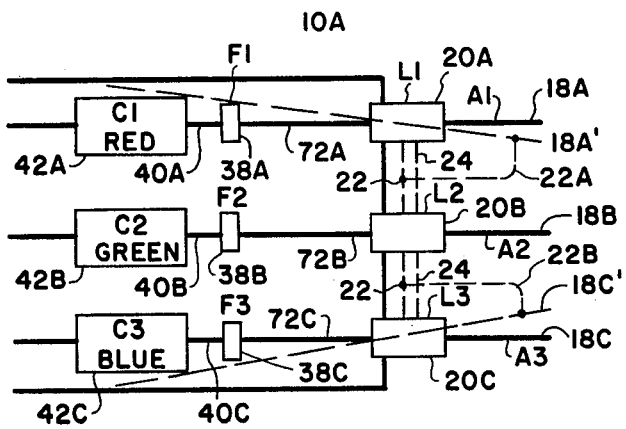
Figure 4:
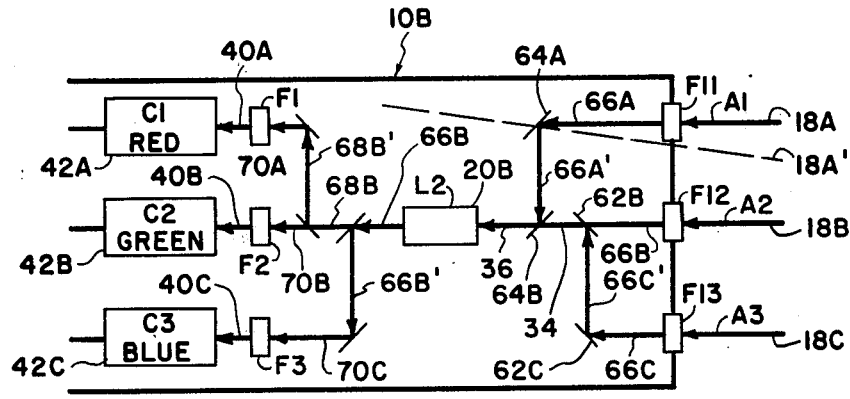

The lens and camera portions of the system of FIG. 1 have been repeated in FIGS. 2, 3 and 4, which show respectively the use of two lenses 20A and 20C, in FIG. 2 substantially identical to that of FIG. 1. In FIG. 2 the axis 18A is shown tilted inwardly in accordance with the dash line 18A. The description of FIG. 2 is substantially identical to the portion of FIG. 1 and will not be repeated.

In FIG. 3 the lens and video camera tube and filter portions of the system of FIG. 1 are reproduced, except that in FIG. 3 there are now three lenses L1, L2 and L3, respectively numbered 20A, 20B and 20C, which define the three optical axes 18A, 18B and 18C. The three lenses L1, L2 and L3 are tied together by controls 22 and 24 as in the case of FIG. 1, so that they will track each other on focus and zoom. No internal mirrors are needed and each lens supplies the light for one of the video cameras C1, C2 and C3. The filters F1, F2 and F3 are identical to those in FIG. 1, and the action is substantially as described for FIG. 1. In FIG. 3 the rotation of the two outer axes 18A and 18C to the position of the dash lines 18A and 18C indicates that the two outer axes are rotated inwardly at an angle such as to intersect the center optical axis 18B at a selected distance in front of the camera. These could be controlled manually, as automatically or mechanically in response to the focus control 22. This automatic control is shown by the dashed lines 22A, 22B from the control 22 to the optical axes, 18A' and 18C'.

FIG. 4 is another embodiment of the lens and camera tube section indicated generally by numeral 10B. Here a single lens L2 is utilized and all of the light going to the three video tubes 42A, 42B and 42C are supplied by the single lens L2, by means of semi-transparent mirrors, as is done in the conventional video camera. Thus the beam 66B is broken up into two parts 66B' which supplies the beam 70C through filter F3 to the third camera C3. Another part of the light in beam 66B goes as beam 68B to a second partially reflecting mirror which diverts part of the light as beam 68B' to another completely reflecting mirror and to the filter F1 and to the first video tube C1. Here again the filter F1 passes red light to the video camera tube. The remaining part of the beam 66B goes as beam 70B to filter F2 which passes green light to the second video camera tube 42B.

The main improvement in this embodiment is out in advance of the lens where there are three spaced apart filters and spaced apart substantially parallel optical axes 18A, 18B and 18C. The filter F11 passes red light similarly to FIG. F1 to the lens. Filter F12 passes green light and is a substantially identical to filter F2. Filter F13 passes blue lights similar to that of filter F3. Thus filter F11 is in the optical axis A1 which passes light of the first primary color through a fully reflecting mirror 64A through a partially reflecting mirror 64B to the lens L2. Similarly the third optical axis 18C passing through the filter F13 passes a blue light as beam 66C to fully reflecting mirror 62C, to partially reflecting mirror 62B, and on through to the lens L2 and to the green second camera C2. The green light is defined by axis 18B and passes through filter F12 and two partially reflecting mirrors 62B and 64B through the lens L2 and through two additional partially reflecting mirrors, to the filter F2 and to the second video camera tube. It will be clear that a simple lens co-axial with each of the axes 18A, 18B, and 18C preferably in advance of the filters F11, F12, F13 may serve to better define the three optical axes.

Again, if the axes 18A, 18B, and 18C are precisely parallel, there will be no three-dimensional optical effect; however, if the axis 18A is rotated inwardly as shown by the dash line 18A' there will be some contribution to three-dimensionality of the display.

One of the problems of rotation of the optical axis in conjunction with the use of mirrors is important, since the light passes through filter F11 must be precisely focused and positioned with the other two light components, even though the axis 18A is rotated. To do this the axis 18A' is rotated at the center of the mirror 64A as shown.

Figure 5:
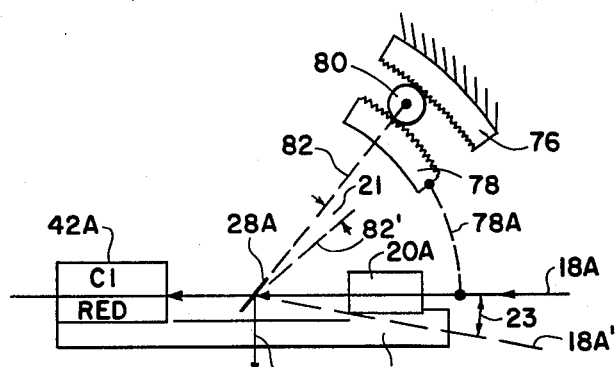
FIG. 5 illustrates a detail of the rotation of the optical axes.

Referring now to FIG. 5 which is designed around the schematic diagram of FIG. 2 and FIG. 4, the nominal direction of the optical axis 18A is shown, and the rotated axis 18A' is shown. The center of rotation is at the center of the mirror 28A. In the drawing the element 76 is a stationary circular concave rack, and 78 is a circular convex rack, which is attached to, and moves with the axis 18A as shown by the dashed line 78A. Numeral 80 represents a small pinion positioned between the two racks 76 and 78. As the rack 78 moves through a selected angle say 10°, the pinion 80 will move only half that distance. Thus as the axis 18A rotates to 18A' the plane 82 of the mirror 28A will rotate to 82' through an angle 21 just one-half of that of the angle 23 of axis 18A'. Thus angle 21 is one-half of angle 23.

As the axis 18A is rotated, and drives the rack 78 the mirror 28A will follow in proper angle, so that the entering light through the lens 20A will be precisely in the same beam 30A, even though the axis does change. Thus the picture passed through the beam 30A to the second camera tube will not move even though the optical axis changes.

As shown in FIG. 1 green light is supplied to the camera C2 from lenses L1 and L3. While the pictures will be stationary in view of the rotation of the axes 18A and 18C, the pictures that are represented will be slightly different and therefore there may be some minor blurring in the yellow picture in which case one of the other mirrors 28A or 28C can be removed so that the green light is supplied only by one lens L1 or L3.

In order to utilize the improved camera system of FIGS. 1, 2, 3 and 4, all that is needed to view the reproduced pictures in the receiver is the eye glass 97 shown and described in FIG. 7. If the glasses of FIG. 7 are not used, then the picture produced by the television signals from FIG. 1 will look like any conventional television signal and will be only two-dimensional.

Figure 6:
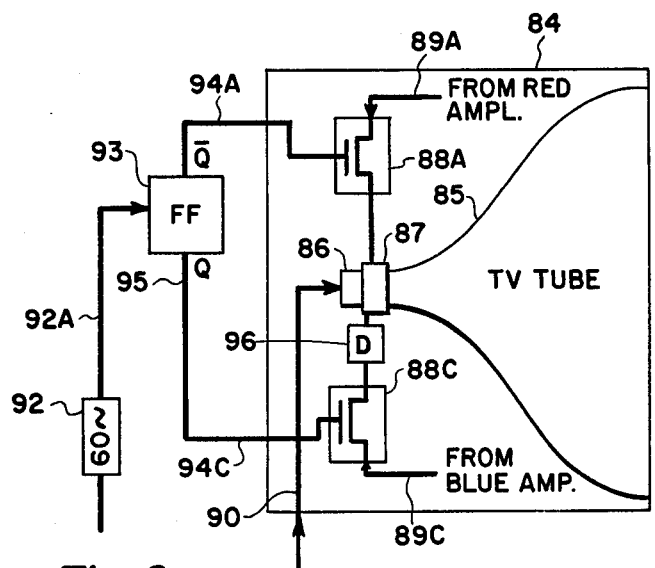
FIG. 6 illustrates a further embodiment which involves a modification of the television receiver circuit.

Referring now to FIG. 6 there is shown an embodiment in which the television receiver is modified to provide a pseudo three-dimensional viewing. There will only be a two-dimensional picture, although there may be a psychological effect suggestive of three-dimensionality. The actual TV transmitted picture arrives on lead 90 to the TV tube 85 in the receiver 84. This is strictly a two-dimensional picture as is conventional. However, what has been done is to take a synchronizing signal either from the TV circuit on lead 90, or from the local power system, 60 cycle power 92, which drives, through lead 92A, a flip-flop 93. This flip-flop through the Q and $\bar{Q}$ outputs, control two analog switches, 88A and 88C. These switches sequentially control and mute the red signal, and then the blue signal; one in one sub-raster, and the other in the other sub-raster. Thus the video amplifier outputs, on lead 89A, the red signal, which goes through the switch 88A to the coupling unit 87, to control the red gun. Similarly, the blue signal from the blue video amplifier and lead 89C goes through the switch 88C to control the blue gun. But the Q and $\bar{Q}$ signals alternately mute the red and the blue by putting a high signal, or logical one, on the lead 94A to enable the red signal, or on 94C to enable the blue signal. If desired 89C (or in lead 89A) on analog phase shift or delay register 96 can be inserted in the lead so that the display of the blue signal (or the red signal) will be delayed or phase shifted from the display of the other signal, and will psychologically provide an impression of three-dimensionality.

What has been described is an improvement in video camera and processing apparatus for generating television signals from a visual scene, such that these signals when reproduced in a receiver and viewed with colored glasses will give the impression of three-dimensionality, to the picture displayed on a two-dimensional surface.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. Apparatus for generating and processing television signals of a visual scene for viewing in three-dimensions, comprising;
   (a) first, second, and third video camera tubes, each with their corresponding optical axes in a horizontal plane and nominally parallel to each other; each camera tube sensitive to light of a selected primary color, respectively;
   (b) means to transmit said visual scene light, of a first primary color to said first camera tube, light of a second primary color to said second camera tube, and light of a third primary color to said third camera tube;
   (c) means to drive the scanning systems in said three camera tubes responsive to a synchronizing signal in an interlaced first and second raster;
   (d) means to mute the output signal of said first camera tube on said first raster; and
   (e) means to mute the output signal of said third camera tube on said second raster.

2. The apparatus as in claim 1 including;
   (f) means for rotating at least one of said first and third optical axes, inwardly, within said selected plane, so as to intersect said second optical axis at a selected distance in front of said camera tubes.

3. The apparatus as in claim 2 including;
   (g) means to process and transmit the combined output signals from said three camera tubes to a video receiver, and to display said rasters; and
   (h) means for a viewer to view said displayed rasters with eye glasses in which each eye is provided with one of said first and third primary colors.

4. The apparatus as in claim 1 in which said means to mute the output signal of said first and third cameras comprises;
   (a) analog switch means connected in the output leads of said first and third camera tubes, in which said first camera tube output goes to a first analog switch means and said third camera output goes to a second analog switch means;
   (b) synchronous switching control means controlled by said synchronizing signal;
   (c) one output of said switching control means connected to enable said first analog switch means; and
   (d) a second output of said switching control means connected to enable said second analog switch means, said first and second outputs out of phase with each other.

5. The apparatus as in claim 1 in which said means to transmit light from said visual scene comprises;
   (a) a first lens along said first axis for passing light through a first color filter to said first camera tube;
   (b) a second lens along said second axis for passing light through a second color filter to said second camera tube;
   (c) a third lens along said third axis for passing light through a third color filter to said third camera tube.

6. The apparatus as in claim 1 in which said means to transmit light from said visual scene comprises;
   (a) a first lens along said first axis for passing light through a first color filter to said first camera tube, and for passing light through a second filter to said second camera tube;
   (b) a second lens along said third axis for passing light through at least a third color filter to said third camera tube.

7. The apparatus as in claim 6 including means for passing light from said second lens also through a second filter to said second camera tube.

8. The apparatus as in claim 1 in which said means to transmit light from said visual scene comprises;
   (a) a lens;
   (b) means between said lens and said camera tubes to transmit light through a first color filter to said first camera tube, and to transmit light through a second filter to said second camera tube, and to transmit light through a third filter to said third camera tube;
   (c) means in front of said lens, to provide light to said lens from said scene along a first axis spaced from, and substantially parallel to a second axis, which is the axis of said lens, and a third axis, spaced from and substantially parallel to said second axis, on the opposite side of said second axis from said first axis; all three axes in a horizontal plane; and
   (d) a first color filter in said first axis; a second color filter in said second axis; and a third color filter in said third axis.

9. The apparatus as in claim 8 including means to rotate at least one of said first and third axes so as to intersect said second axis at a selected distance in front of said lens responsive a focus control means of said lens.

10. In a television camera and display system comprising;
    (a) an optical system defining three nominally parallel, spaced, optical axes, in a horizontal plane, the first and third axes on opposite sides of said second axis.

(b) means to transmit light arriving from a viewing scene along said first axis to a first video camera tube, through a first light filter that passes a first primary color;

(c) means to transmit light arriving along said second axis to a second video camera tube, through a second light filter that passes a second primary color;

(d) means to transmit light arriving along said third axis to a third video camera tube through a third light filter that passes a third primary color;

(e) synchronizing means to provide first and second rasters interlaced;

the method of operating said television and display system, comprising the steps of:

(1) muting the video output signal of said first camera tube, on said first raster;

(2) muting the video output signal of said second camera tube on said second raster; and (3) viewing the video picture on a receiver tube through eye glasses in which one glass passes said first primary color, and the second glass passes said third primary color.

11. The method as in claim 10 including the additional step of rotation, in the common plane, at least one of said first and third axes toward the other so as to intersect at a selected distance in front of said cameras.

12. Apparatus for providing a television display having a pseudo three-dimensional character comprising;

(a) a conventional television (TV) receiver supplied with a conventional TV signal having signal components for control of three color guns reproducing the three primary colors, such as red, green and blue, for example, and having video amplifiers for amplifying at least said red and blue signals, (b) at lest two separate analog switch means to control the passage of said red and blue signals to said corresponding red and blue guns respectively; and (c) means to sequentially enable one and then the other of said two analog switch means so that the red signal is muted during one sub-raster, and the blue signal is muted during the other sub-raster.

13. The apparatus as in claim 12 including means to inject a selected small phase shift in one or the other of said switched red and blue signals.

* * * * *